July 1, 1952 L. R. FINK 2,602,140

COINCIDENCE TIMING SYSTEM

Filed March 24, 1950

Inventor:
Lyman R. Fink,
by Merton D. Morse
His Attorney

Patented July 1, 1952 2,602,140

UNITED STATES PATENT OFFICE 2,602,140

COINCIDENCE TIMING SYSTEM

Lyman R. Fink, Syracuse, N. Y., assignor to General Electric Company, a corporation of New York Application March 24, 1950, Serial No. 151,797

4 Claims. (Cl. 250—36)

Figure 1:
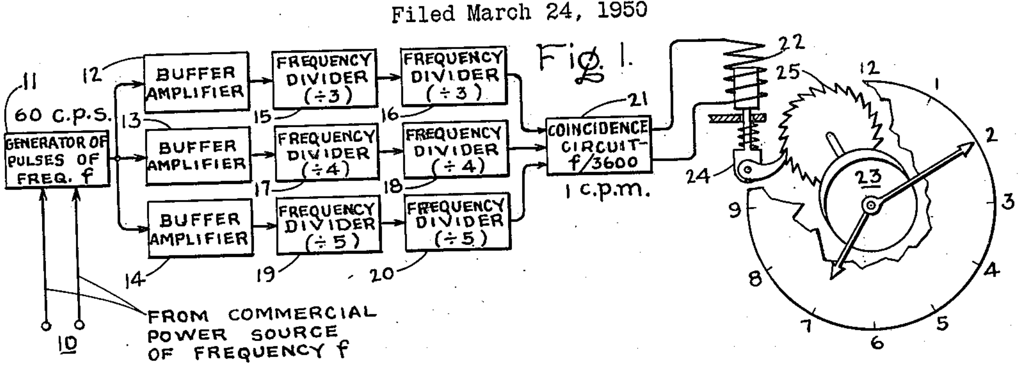

My invention relates to an electrical system for deriving a periodic electrical wave, or several waves, suitable for timing or control purposes, from a periodic control wave of higher fundamental frequency.

My invention has particular utility in an electronic timing or frequency dividing system where a very large division ratio is desired. As an illustration, it is common practice to employ a two-pole synchronous motor in secondary electric clocks operating from a 60-cycle power supply of carefully-controlled frequency. This requires an intricate gearing arrangement between the 3600 R. P. M. motor and the hour hand of the clock, having a division ratio of 216,000 to 1. It would obviously be a great advantage to have a simple and precise electrical frequency dividing system to accomplish the required division ratio, or at least division to a frequency which is only a small multiple of the desired ratio, so that much simpler stepping counters or solenoid-operated relays could be substituted for the complex motor mechanism and gear train.

Many other obvious applications for such an electrical frequency dividing system will also readily suggest themselves to those skilled in the art. For example, a low frequency signal generator is often desired for test purposes capable of producing any one of a number of test frequencies which are sub-multiples of the frequency of a crystal-controlled oscillator of very much higher frequency.

Very briefly, my invention permits the time division, or frequency division, of a periodic electrical wave of fundamental frequency $f$ by a factor $n$, where $n$ is an integer factorable into $m$ integers all of which are prime to each other. To accomplish this, $m$ synchronized control waves are first generated, each derived from the wave of frequency $f$ and each having a fundamental frequency equal to $f$ divided by a different one of the $m$ integers. Finally, the desired wave of fundamental frequency $f/n$ is derived from $m$-fold coincidence between the control waves. Preferably, pulse wave forms are employed, the widths of the various pulses being properly proportioned so that corresponding peak values of all the control waves are coincident only once for every $n$ cycles of the master control wave from which they are all derived. By duplication of the coincidence circuits, or by proper switching arrangements, it is also possible to secure a large number of different division ratios from the same master control wave, either simultaneously or selectively.

It is, accordingly, a main object of my invention to provide an improved electrical system for deriving a periodic electrical wave which has a fundamental frequency which is a particular sub-multiple of the frequency of a second periodic wave.

Another object of my invention is to provide an improved frequency dividing system in which very large division ratios may be achieved in a simple and precise manner.

More specifically, it is an object of my invention to provide an improved coincidence timing system.

Still another object of my invention is to provide an improved timing or frequency division system wherein a plurality of sub-multiple frequencies may be simultaneously derived from a master control frequency without mutual interference.

For additional objects and advantages, and for a better understanding of my invention, attention is now directed to the following description and accompanying drawings. The features of the invention believed to be novel are particularly pointed out in the appended claims.

Figure 2:
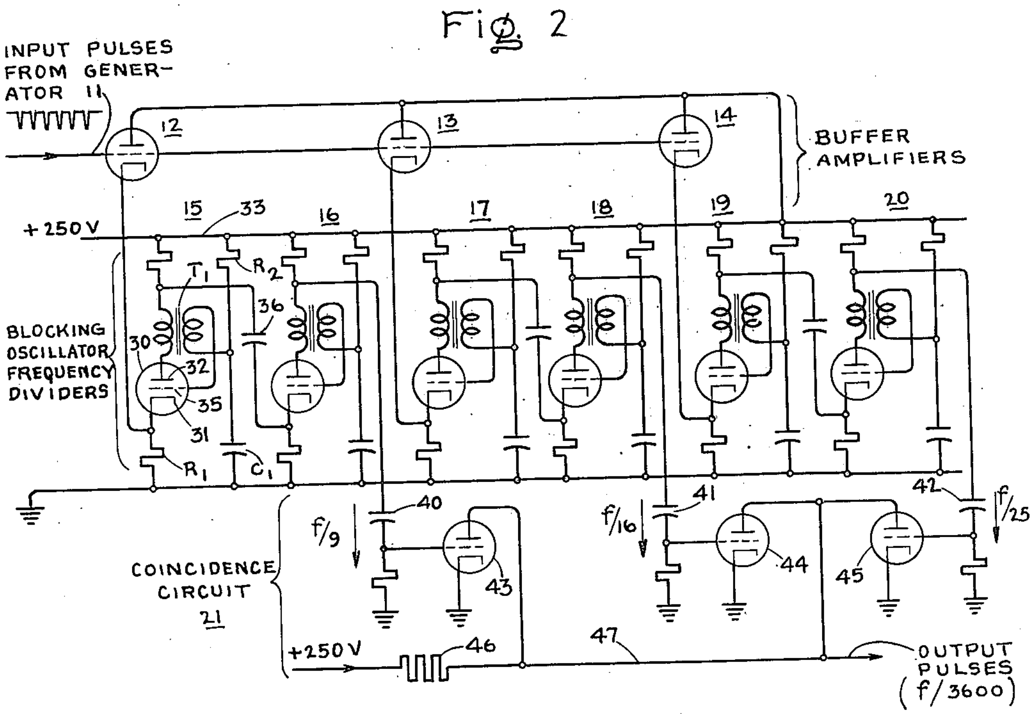
Figure 3:
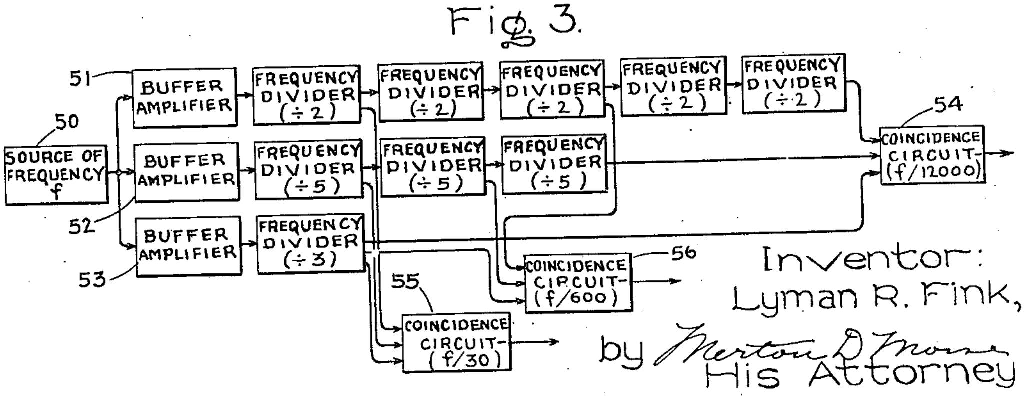

In the drawings, Fig. 1 is a schematic diagram, partly in simplified block form, of a secondary clock system employing the principles of my invention; Fig. 2 is a detailed circuit diagram showing circuits suitable for use in the system of Fig. 1; and Fig. 3 is a simplified block diagram illustrating another embodiment of my invention.

Fig. 1 shows an application of my invention to a secondary electric clock system adapted to be synchronized from a pair of commercial power lines 10, carrying alternating current of predetermined, controlled frequency $f$. This frequency $f$ may conventionally be 60 cycles per second. The alternating current wave from power lines 10, which will generally be of sine-wave form, is preferably used to control the generation of a train of short unidirectional pulses recurring at the same fundamental frequency. This is represented schematically in Fig. 1 by the generator 11, which may comprise any one of a number of well-known circuits, for example, a wave shaping and clipping circuit, a synchronized multi-vibrator or a blocking oscillator.

The 60-cycle pulse output from source 11 is simultaneously applied through respective buffer amplifiers 12, 13, 14 to three frequency dividing chains. In the particular circuits chosen for purposes of illustration, the first chain is represented schematically as consisting of two cascaded frequency dividers 15, 16, each adapted to be synchronized from a preceding source to produce an output pulse wave of one-third the frequency of the wave applied to its input. As in the case of source 11, each of these dividers may comprise any one of a number of circuits well known to the art, such as blocking oscillators, multivibrators, flip-flop circuits, ring counters, step counters, etc. In similar manner, the second chain is illustrated as comprising two frequency dividers 17 and 18, each having a division ratio of four to one, and the third chain comprises frequency dividers 19 and 20 each having a frequency division ratio of five to one.

In accordance with my invention, the division ratios of the several frequency dividing chains are related in a particular manner. In this particular illustration, let it be assumed that we wish to produce a resultant train of output timing pulses having a fundamental frequency of one cycle per minute. This means that the 60-cycle input frequency must be divided by the integer 3600. To accomplish this in accordance with the invention, I arrange the division ratios of the three chains so that their product equals 3600 and so that they are related to each other by whole numbers prime to each other. Thus, in this case, the division ratios may be 9, 16 and 25, respectively.

It will now be apparent that if the maximum widths of the pulses at the outputs of the three chains do not exceed the spacing between adjacent pulses from the chain operating at the highest fundamental frequency, and if the trains of pulses are all rigidly synchronized with the source 11, then a triple coincidence between them will occur only once for every 3600 pulses from source 11. This triple coincidence is utilized to produce a resultant output pulse by supplying the pulses from the three trains to any suitable known form of coincidence circuit 21. The output pulses, recurring at the rate of one per minute, may then be utilized in any suitable manner to operate a clock mechanism. They may, for example, be applied to a stepping counter of the odometer type, in which hours and minutes are indicated on three coaxial drums; or as illustrated in Fig. 1, they may be applied to energize a stepping relay 22 which actuates a very simple clock mechanism 23 through a pawl and ratchet 24, 25.

In the illustrative system of Fig. 1, if it were alternatively desired to obtain an output wave having a fundamental frequency of one cycle per second, it is obvious that it would only be necessary to apply the outputs of frequency dividers 15, 17, 19 to a triple coincidence circuit. If, on the other hand, it were desired to obtain an output pulse wave having a frequency of one cycle per hour, it is obvious that it would merely be necessary to add one more divider to each of the three chains, this divider having the same frequency division ratio as the preceding stages.

For completeness of illustration, I have shown in Fig. 2 the detailed circuits of one suitable arrangement of the frequency dividing chains and coincidence circuit of Fig. 1. Wherever feasible, corresponding reference numerals have been employed to facilitate comparison. The input pulses of fundamental frequency $f$ are impressed in negative polarity upon the control grids of the three buffer amplifiers 12, 13, 14 in parallel. Each of the frequency dividers 15–20 comprises a well-known form of blocking oscillator circuit, employing a triode amplifier. Since the circuits of all of these blocking oscillators may be identical except for circuit constants, only the first blocking oscillator 15 will be described in detail.

The first blocking oscillator in each of the dividing chains is triggered by common cathode coupling with the corresponding buffer amplifier through a common cathode resistor. Thus, in the blocking oscillator 15, the triode 30 has its cathode 31 connected to ground through the cathode resistor $R_1$, which is also in the cathode circuit of amplifier 12. Its anode 32 is connected to a suitable source of anode operating potential, represented conventionally by the +250-volt bus 33, through the primary of feedback transformer $T_1$ and anode load resistor 34 in series. The control grid 35 is connected through the secondary of transformer $T_1$ and through timing capacitor $C_1$ to ground. A discharge path for capacitor $C_1$ is also provided through discharge resistor $R_2$ to the positive power supply bus.

The operation of the blocking oscillator will be familiar to those skilled in the art. Assume first that the buffer amplifier 12 is conducting and that capacitor $C_1$ is sufficiently discharged that the next negative timing pulse applied to cathode 31 is sufficient to drive the grid 35 above cut-off. Tube 30 now draws a pulse of anode current which causes a voltage drop across the primary of transformer of $T_1$. The polarity of the transformer connections is such that this appears as a positive voltage pulse at the control grid 35, causing a cumulative increase in conduction until the control grid 35 very rapidly becomes positive with respect to the cathode, limiting the current. Capacitor $C_1$ is also charged very rapidly during this interval. When the rate of voltage buildup on the capacitor $C_1$ exceeds the rate of voltage buildup on the transformer $T_1$, the grid voltage again starts to decrease. By reverse transformer action, this action is again cumulative, driving the tube 30 very rapidly to cut-off. It then remains cut off for a period of time largely determined by the discharge time constant $R_2$—$C_1$, until capacitor $C_1$ has discharged sufficiently so that the next succeeding trigger pulse at cathode 31 again drives the control grid 35 above cut-off, causing the cycle to repeat. Thus, the triggered pulse generator circuit 15 develops a train of sharp voltage pulses across load resistor 34, these pulses being synchronized with pulses from generator 11, but recurring at a submultiple rate.

Each negative voltage pulse in the anode circuit of the triggered pulse generator, specifically a blocking oscillator, is transferred through coupling capacitor 36 to trigger the next blocking oscillator in the chain. The approximate time that each blocking oscillator remains cut off between pulses is approximately determined by adjusting the respective discharge resistors. In order that each blocking oscillator may operate as a precise frequency divider, the values of these resistors must be set within fairly narrow limits. If all of the timing capacitors $C_1$ are of identical values, then the resistances of the discharge resistors will be related in the ratios of the required frequency division factors; i. e., reading from left to right in Fig. 2, they will have relative values of 3, 9, 4, 16, 5 and 25 units.

In the case of the particular division ratios employed in Fig. 1, the pulse repetition rates at the outputs of the blocking oscillators 16, 18 and 20 will be respectively one-ninth, one-sixteenth and one-twenty-fifth of the repetition rate of the input pulses. These three series of pulses are supplied respectively through the coupling capacitors 40, 41, 42 to the control grids of coincidence tubes 43, 44, 45. The anode circuits of these three tubes are coupled through a common anode resistor 46 to the anode supply bus. Their anode voltages are held to relatively low values by the anode currents drawn by the three tubes, unless all three are simultaneously biased to cutoff by the applied trigger pulses from the frequency dividing chains. If the pulse widths are narrow relative to the minimum spacing between any two adjacent trigger pulses, then it will be apparent that a positive voltage pulse of maximum amplitude appears on the common anode conductor 47 only when pulses from all three chains are coincident. The resultant output pulses may be supplied to a further amplitude clipper, if desired, to remove all except the most positive peaks.

The following general principles may be deduced from the foregoing: First, if it is desired to divide an input frequency by an integer $n$ whose factors are $a_1, a_2, a_3 \ldots a_m$, then $m$ separate frequency dividers may be supplied with the input frequency and the $m$ separate outputs may be supplied to an $m$-fold coincidence circuit. It is also required that no pair of numbers $a_1, a_2, a_3, \ldots a_n$ be divisible by the same number (other than one); that is, all of these numbers must be prime to each other. When this requirement is met by properly dividing the integer $n$ into factors, some of the factors may not be prime to each other. It is then possible to make the divider for this number consist of a multiplicity of dividers in cascade, thereby securing smaller dividing ratios, the ratios for each of the separate chains being prime to each other.

These principles are further illustrated in the block diagram of Fig. 3. Here the frequency $f$ from source 50 is supplied through buffer amplifiers 51, 52, 53 to three dividing chains each of which has a different number of dividers in cascade. Assume that it is desired to divide frequency $f$ by 12,000 at the output of a coincidence circuit 54. The smallest integral factors of 12,000 are 2, 2, 2, 2, 2, 5, 5, 5 and 3. The factors 2 may be combined in a first chain having a total division ratio of 32 to one, the factors 5 may be combined in a second chain having a division ratio of 125 to one and the third chain may be a single divider having a ratio of 3 to one. This is illustrated in Fig. 3. It will, of course, be obvious that several of the divider circuits in each chain might also be combined in a single divider. The only requirement is that the total division ratio of each complete chain be related to the ratios of the other chains by whole numbers prime to each other: 32, 125 and 3 in this case.

Fig. 3 also illustrates that it is possible to operate a plurality of coincidence circuits simultaneously from different points on the respective chains. Thus, a coincidence circuit 55 is represented for obtaining a frequency division ratio of 30 to one and a third coincidence circuit 56 is illustrated for obtaining a frequency division ratio of 600 to one. It is important to note that the use of parallel-operated frequency dividing circuits and multiple coincidence, in accordance with my invention, insures substantially complete freedom from false triggering due to feedback or parasitic couplings, because all the fundamental frequencies involved are prime to each other, and, therefore, their corresponding harmonics are likewise prime to each other.

As compared to previous frequency division systems employing series-connected frequency dividers, it should also be noted that large division ratios can be achieved without requiring similar ratios between the time constants of the first and last dividers in any chain. In particular, a frequency can be divided by a very large ratio, using the circuits illustrated in Fig. 2, without the use of very large resistors or capacitors, and without any particularly stringent requirements on leakage resistance. This advantage applies to circuits employing free-running oscillators, flip-flops or multivibrators, or quasistable types of counters, such as stair-step counters, for example. By switching coincidence tube inputs, or by using a plurality of separate coincidence circuits, as illustrated in Fig. 3, all possible factorial combinations of dividers may be utilized simultaneously or selectively without interaction.

While specific frequency dividing and coincidence circuits have been shown and described to illustrate the principles of my invention, and various modifications thereof suggested, it will, of course, be understood that various other types of circuits for these purposes may be used without departing from the invention in its broader aspects and I intend in the appended claims to cover any such modifications as fall within the true spirit and scope of the invention.

What I claim as new and desire to secure by Letters Patent of the United States is:

1. An electrical timing system for deriving a periodic electrical wave of fundamental frequency $f/n$ from a source of waves having fundamental frequency $f$, where $n$ is an integer factorable into $m$ integers all prime to each other, comprising a plurality of $m$ frequency dividing means simultaneously energized from said source, said means producing $m$ synchronized control waves each having a fundamental frequency equal to $f$ divided by a different one of said $m$ integers, a coincidence circuit having $m$ inputs, and means for impressing said control waves on said respective inputs, said coincidence circuit providing an output voltage only upon $m$-fold coincidence of corresponding crests of said control waves.

2. In a frequency dividing system, a source of periodic electrical waves having crest values of one polarity recurring at a fundamental frequency $f$, said frequency being divisible by an integral number $n$ which is, in turn, factorable into $m$ integers all prime to each other, a group of $m$ pulse generating circuits each individually synchronized from said source and producing a train of pulses recurring at $f$ divided by a different one of said integers, the widths of all said pulses being less than the spacing between adjacent pulses of the train of highest recurrence frequency, and a pulse coincidence circuit controlled by all said trains of pulses for producing an output pulse only in response to time coincidence of all said pulses.

3. A coincidence timing system for producing a train of electrical output pulses of fundamental recurrence frequency $f/n$ in synchronism with a periodic control wave of fundamental frequency $f$, where $n$ is a whole number factorable into $m$ integers all prime to each other, comprising a plurality of $m$ chains of frequency dividers each synchronizable from said control wave and having a division ratio equal to a different one of said integers, means for impressing said control wave on all said chains in parallel, each chain producing a train of synchronized control pulses of fundamental frequency equal to $f$ divided by the corresponding integer, and means comprising a pulse coincidence circuit conjointly controlled by said $m$ chains for producing an output pulse only in response to $m$-fold coincidence of said control pulses.

4. An electrical system for deriving a periodic electrical wave, having crest values recurring at a frequency $f/n$, from a second wave having crest values recurring at a frequency $f$, where $n$ is a whole number factorable in $m$ integers each prime to each other, a plurality of $m$ frequency dividing means each synchronizable from said second wave, means for impressing said second wave on all said dividing means in parallel, each dividing means producing a control wave at its output having crest values recurring at a frequency equal to $f$ divided by a different one of said integers, and means comprising a coincidence circuit energized from all said outputs in parallel for producing a periodic electrical wave having crests corresponding to $m$-fold coincidence of the crests of said control waves.

LYMAN R. FINK.

REFERENCES CITED

The following references are of record in the file of this patent:

FOREIGN PATENTS

| Number | Country | Date |
|---|---|---|
| 510,881 | Great Britain | Aug. 8, 1939 |